United States Patent
Jung et al.

(10) Patent No.: US 9,164,335 B2
(45) Date of Patent: Oct. 20, 2015

(54) DISPLAY PANEL AND METHOD OF MANUFACTURING THE SAME

(71) Applicant: Samsung Display Co., Ltd., Yongin, Gyeonggi-Do (KR)

(72) Inventors: Jin-Soo Jung, Hwaseong-si (KR); Young Gu Kim, Hwaseong-si (KR); Byoung-Hun Sung, Hwaseong-si (KR); Baekkyun Jeon, Yongin-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 207 days.

(21) Appl. No.: 13/764,249

(22) Filed: Feb. 11, 2013

(65) Prior Publication Data

US 2013/0335660 A1 Dec. 19, 2013

(30) Foreign Application Priority Data

Jun. 18, 2012 (KR) .................. 10-2012-0064917

(51) Int. Cl.
*G02F 1/1345* (2006.01)
*G02F 1/1333* (2006.01)

(52) U.S. Cl.
CPC .......... *G02F 1/1345* (2013.01); *G02F 1/13452* (2013.01); *G02F 1/133345* (2013.01); *G02F 2001/133388* (2013.01); *G02F 2202/022* (2013.01)

(58) Field of Classification Search
None
See application file for complete search history.

(56) References Cited

U.S. PATENT DOCUMENTS

| | | | | |
|---|---|---|---|---|
| 5,235,451 A | * | 8/1993 | Bryan | 349/149 |
| 5,721,602 A | * | 2/1998 | Narayan et al. | 349/161 |
| 6,104,464 A | * | 8/2000 | Adachi et al. | 349/150 |
| 7,088,050 B2 | | 8/2006 | Ishibashi et al. | |
| 7,750,899 B2 | | 7/2010 | Miyata et al. | |
| 8,294,870 B2 | * | 10/2012 | Kang et al. | 349/160 |
| 2002/0085158 A1 | * | 7/2002 | Armagost et al. | 349/149 |
| 2007/0236623 A1 | * | 10/2007 | Heo et al. | 349/42 |
| 2010/0026938 A1 | * | 2/2010 | Hattori et al. | 349/96 |
| 2010/0195039 A1 | * | 8/2010 | Park | 349/152 |
| 2011/0013107 A1 | * | 1/2011 | Mori et al. | 349/46 |
| 2011/0121273 A1 | * | 5/2011 | Jo et al. | 257/40 |
| 2011/0244752 A1 | * | 10/2011 | Lee | 445/24 |
| 2011/0279766 A1 | * | 11/2011 | Kitoh et al. | 349/152 |

(Continued)

FOREIGN PATENT DOCUMENTS

| | | |
|---|---|---|
| JP | 2009-271192 A | 11/2009 |
| JP | 2010-182093 A | 8/2010 |
| JP | 2010-212108 A | 9/2010 |

(Continued)

*Primary Examiner* — Richard Kim
*Assistant Examiner* — Ryan Crockett
(74) *Attorney, Agent, or Firm* — Cantor Colburn LLP

(57) ABSTRACT

A display apparatus includes an array substrate an opposite substrate facing the array substrate, and a liquid crystal layer disposed between the array substrate and the opposite substrate. The array substrate includes a display area, a non-display area, including first and second non-display areas, a pad area, the first non-display area adjacent to the pad area, a first base substrate disposed in the display area and in the non-display area, an organic polymer layer disposed in the pad area and in the first non-display area, a thin film transistor disposed in the display area, a pixel electrode connected to the thin film transistor, and a signal input pad connected to the thin film transistor and disposed on the organic polymer layer in the pad area. The organic polymer layer is disposed on the first base substrate in the first non-display area.

11 Claims, 14 Drawing Sheets

(56) References Cited

U.S. PATENT DOCUMENTS

2013/0342779 A1* 12/2013 Jung et al. .................. 349/43
2014/0104528 A1* 4/2014 Jung et al. .................. 349/43

FOREIGN PATENT DOCUMENTS

| | | |
|---|---|---|
| JP | 2011-047976 A | 3/2011 |
| JP | 2011-047977 A | 3/2011 |
| JP | 2011-209405 A | 10/2011 |
| KR | 1020090100949 A | 9/2009 |
| KR | 1020090102215 A | 9/2009 |
| KR | 1020090102561 A | 9/2009 |
| KR | 1020090107301 A | 10/2009 |
| KR | 100960165 B1 | 5/2010 |
| KR | 100972091 B1 | 7/2010 |
| KR | 100976581 B1 | 8/2010 |
| KR | 100977734 B1 | 8/2010 |
| KR | 1020100116031 A | 10/2010 |
| KR | 1020110020050 A | 3/2011 |
| KR | 1020110064287 A | 6/2011 |

* cited by examiner

DISPLAY PANEL AND METHOD OF MANUFACTURING THE SAME

This patent application claims priority to Korean Patent Application No. 10-2012-0064917, filed on Jun. 18, 2012, and all the benefits accruing therefrom under 35 U.S.C. §119, the content of which is herein incorporated by reference.

BACKGROUND

1. Field

The disclosure relates to a display panel and a method of manufacturing the same. More particularly, the disclosure relates to a display panel capable of reducing a pad area connected to an external circuit module and a method of manufacturing the display panel.

2. Description of the Related Art

In general, a display device includes a display panel displaying an image and an external circuit module applying various control signals to the display panel. The display panel includes a display area in which the image is displayed and a non-display area in which the image is not displayed. The display panel and the external circuit module are accommodated in a receiving container, e.g., a chassis. In addition, the display panel and the external circuit module are connected to each other by signal wires, such as a tape carrier package or a flexible printed circuit board.

The signal wires are attached between a side portion of the display panel and the external circuit module. Accordingly, the display panel is required to provide a space at the side portion, to which the signal wires are attached. The side portion of the display panel is in the non-display area of the display panel. Since the space at the side portion increases the non-display area of the display panel in which the image is not displayed, and thereby undesirably increases an overall planar dimension of the display panel, reduction of a size of the non-display area is desired.

SUMMARY

One or more exemplary embodiments, of the disclosure provides a display panel capable of reducing a pad area connected to an external circuit module.

One or more exemplary embodiments, of the disclosure provides a method of manufacturing the display panel.

Embodiments of the invention provide a display panel including an array substrate an opposite substrate that faces the array substrate and includes a second base substrate, and a common electrode disposed on the second base substrate, and a liquid crystal layer disposed between the array substrate and the opposite substrate. The array substrate includes a display area, a non-display area surrounding the display area, and a pad area extended from a side of the non-display area. The non-display area includes a first non-display area adjacent to the pad area and a second non-display area except for (e.g., excluding) the first non-display area. The array substrate further includes a first base substrate disposed in the display area and in the non-display area, an organic polymer layer disposed in the pad area and in the first non-display area, a thin film transistor disposed in the display area, a pixel electrode connected to the thin film transistor, and a signal input pad connected to the thin film transistor and disposed on the organic polymer layer in the pad area. The organic polymer layer is disposed on the first base substrate in the first non-display area.

The organic polymer layer extends from the first non-display area to the display area of the first base substrate. The thin film transistor is disposed on the organic polymer layer. The array substrate further includes an insulating layer disposed between the organic polymer layer and the thin film transistor.

The first base substrate includes a trench having a concave shape in the first non-display area adjacent to the pad area. The organic polymer layer is disposed in the trench of the first non-display area adjacent to the pad area.

The organic polymer layer includes at least one of polyethyleneterephthalate, polyethylenenapthalate, polycarbonate, polyetherimide, polyethersulfone, polyetheretherketone or polyimide.

Embodiments of the invention provide a method of manufacturing a display panel. The method includes forming a base substrate of an array substrate, the base substrate including a display area, a non-display area surrounding the display area and including a first non-display area adjacent to the pad area and a second non-display area except for the first non-display area, and a pad area extended from a side of the non-display area, providing an organic polymer layer of the array substrate, on the base substrate corresponding to the pad area and the first non-display area, providing a thin film transistor of the array substrate, on the base substrate, which corresponds to the display area, and a signal input pad in the pad area, which is connected to the thin film transistor, providing a pixel electrode of the array substrate connected to the thin film transistor, providing a liquid crystal layer between the array substrate and an opposite substrate including a common electrode facing the array substrate, coupling the array substrate to the opposite substrate, and removing the base substrate from the pad area.

According to one or more exemplary embodiment of the invention, a display panel includes a pad area connected to an external circuit module, and the pad area may be bent. Thus, a planar space required to accommodate the pad area of the display panel may be reduced.

BRIEF DESCRIPTION OF THE DRAWINGS

The above and other advantages of the invention will become readily apparent by reference to the following detailed description when considered in conjunction with the accompanying drawings wherein.

DETAILED DESCRIPTION

Figure 1:
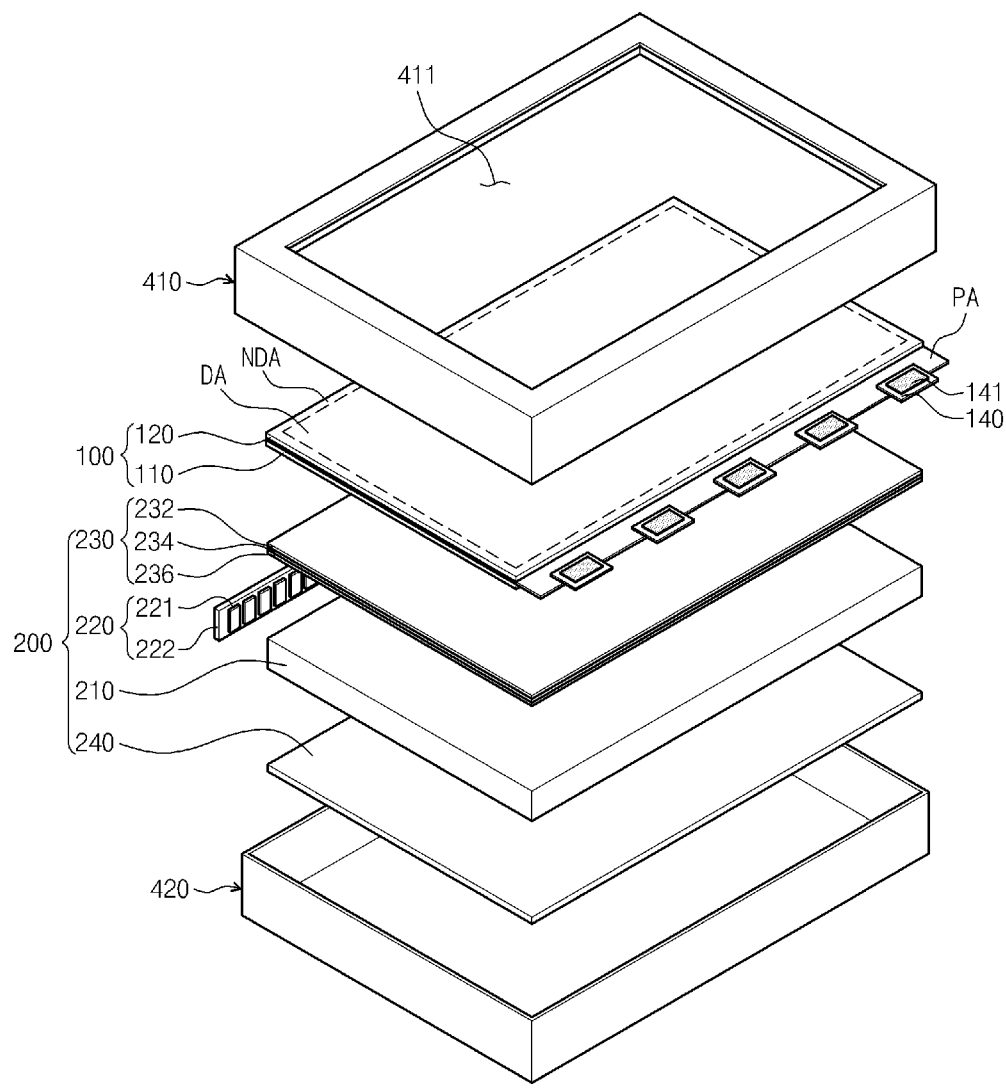
FIG. 1 is an exploded perspective view showing an exemplary embodiment of a display apparatus according to the invention.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "under," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "lower" relative to other elements or features would then be oriented "above" the other elements or features. Thus, the exemplary term "under" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a," "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be explained in detail with reference to the accompanying drawings.

FIG. 1 is an exploded perspective view showing an exemplary embodiment of a display apparatus according to the invention.

Referring to FIG. 1, a display apparatus includes a display panel 100, a backlight unit 200, an upper cover 410 and a lower cover 420.

The display panel 100 may be various display panels, such as a liquid crystal display panel, an electrophoretic display panel, an electrowetting display panel, etc. In the exemplary embodiment, as a representative example, the liquid crystal display panel will be described as the display panel.

The display panel 100 has a rectangular planar shape with long sides and short sides. The display panel 100 includes a display area DA in which an image is displayed, a non-display area NDA disposed adjacent to the display area DA in which an image is not displayed, and a pad area PA extended from at least one side of the non-display area NDA. In addition, the display panel 100 includes an array substrate 110, an opposite substrate 120 facing the array substrate 110 and a liquid crystal layer (not shown) interposed between the array substrate 110 and the opposite substrate 120. The display panel 100 further includes polarizing plates (not shown) respectively attached to its outer surfaces, e.g., an outer surface of the array substrate 110 and an outer surface of the opposite substrate 120.

The array substrate 110 includes a plurality of pixels (not shown) arranged in the display area DA in a matrix form. Each pixel may include a plurality of sub-pixels having different colors from each other, but is not limited thereto or thereby. In one exemplary embodiment, for instance, each sub-pixel has a red, green, blue, yellow or white color. Thus, a light exiting from each sub-pixel has one of the red, green, blue, yellow and white colors. In addition, each pixel includes a gate line (not shown), a data line (not shown) insulated from the gate line while crossing the gate line, and a pixel electrode (not shown). Further, each pixel is electrically connected to the gate line and the data line, and includes a thin film transistor (not shown) electrically connected to the pixel electrode. The thin film transistor switches a driving signal applied to the pixel electrode.

A seal pattern (not shown) is disposed in the non-display area NDA of the array substrate 110 and/or the opposite substrate 120 to couple the array substrate 110 to the opposite substrate 120.

A flexible printed circuit board 140 on which a driver integrated circuit ("IC") 141 is mounted, is connected to the pad area PA of the array substrate 110. The flexible printed circuit board 140 is connected to a circuit module (not shown) external to the display panel 100 and/or to the display apparatus. The driver IC 141 receives various control signals from the external circuit module and outputs the driving signal to the thin film transistor in response to the control signals to drive the display panel 100.

The opposite substrate 120 includes color filters (not shown), each of which realizes a predetermined color using the light provided from the backlight unit 200, and a common electrode (not shown) disposed on the color filters to face the pixel electrode of the array substrate 110. Each color filter may have one color of red, green, blue, yellow and white colors, but is not limited thereto or thereby. In one exemplary embodiment, the color filter may be formed by a deposition or coating process, but is not limited thereto or thereby. In the exemplary embodiment, the color filters are disposed on the opposite substrate 120, but are not limited thereto or thereby. That is, the color filters may be disposed on the array substrate 110.

The liquid crystal layer includes liquid crystal molecules arranged in a specific direction in response to an electric field generated by voltages respectively applied to the pixel electrode and the common electrode, and thus the liquid crystal layer controls a transmittance of the light passing through the liquid crystal molecules, thereby displaying desired images in the display area DA of the display panel 100.

The backlight unit 200 is disposed in an opposite direction to a direction in which the light exiting from the display panel 100 travels. The backlight unit 200 includes a light guide plate 210, a light source unit 220 including a plurality of light sources, an optical member 230 and a reflective sheet 240.

The light guide plate 210 is disposed under the display panel 100 and guides the light emitted from the light source unit 220 to the display panel 100. Particularly, the light guide plate 210 overlaps at least the display area DA of the display panel 100. The light guide plate 210 includes an exit surface from which the light exits, a lower surface facing the exit surface, and side surfaces connecting the exit surface and the lower surface. At least one of the side surfaces faces the light source unit 220 to serve as a light incident surface into which the light emitted from the light source unit 220 is incident. A side surface facing the light incident surface serves as a light reflective surface to reflect the light.

The light source unit 220 includes a printed circuit board 222, and a light source 221, e.g., a light emitting diode, mounted on the printed circuit board 222. The light source unit 220 may include a plurality of light sources 221. The light sources 221 may emit lights having different colors from each other, but are not limited thereto or thereby. In detail, a portion of the light sources 221 may emit a red light, a portion of the light sources 221 may emit a green light, and a remaining portion of the light sources 221 may emit a blue light.

In addition, the light source unit 220 is disposed to emit the light while facing at least one side surface of the side surfaces of the light guide plate 210 and provides the light to the display panel 100 through the light guide plate 210.

The optical member 230 is disposed between the light guide plate 210 and the display panel 100. The optical member 230 controls the light exiting through the light guide plate 210 from the light source unit 220. In addition, the optical member 230 may include a diffusion sheet 236, a prism sheet 234 and a protective sheet 232, which are sequentially stacked one on another, but is not limited thereto or thereby.

The diffusion sheet 236 diffuses the light exiting from the light guide plate 210. The prism sheet 234 condenses the light diffused by the diffusion sheet 236 to allow the light to travel in a direction substantially vertical (e.g., perpendicular) to the display panel 100. The light exiting from the prism sheet 234 is vertically incident into the display panel 100. The protective sheet 232 protects the prism sheet 234 from external impacts.

In the exemplary embodiment, the optical member 230 includes one diffusion sheet 236, one prism sheet 234 and one protective sheet 232, but is not limited thereto or thereby. That is, at least one of the diffusion sheet 236, the prism sheet 234 and the protective sheet 232 of the optical member 230 may be provided in plural number, or one of the diffusion sheet 236, the prism sheet 234 and the protective sheet 232 may be omitted from the optical member 230.

The reflective sheet 240 is disposed under the light guide plate 210. The reflective sheet 240 reflects the light leaked from the light guide plate 210 that is not directed to the display panel 100, to change a path of the light leaked from the light guide plate 210 to the display panel 100. The reflective sheet 240 includes a light reflective material to reflect the light. The reflective sheet 240 is disposed on the lower cover 420 and reflects the light emitted from the light source unit 220. As a result, the reflective sheet 240 increases an amount of the light provided to the display panel 100.

In the exemplary embodiment, the light source unit 220 is disposed to provide the light to a side surface of the light guide plate 210, but is not limited thereto or thereby. That is, the light source unit 220 may be disposed to provide the light to a lower surface of the light guide plate 210. In addition, in a case that the light guide plate 210 is omitted from the backlight unit 200, the light source unit 220 may be disposed under and overlapping the display panel 100, and thus the light emitted from the light source unit 220 may be directly provided to the display panel 100.

The upper cover 410 is disposed on the display panel 100. The upper cover 410 may include an upper plate, and sidewalls which extend downward towards the lower cover 420 from the upper plate. The upper plate of the upper cover 410 is provided with a display window 411 extended through a thickness thereof, to expose the display area DA of the display panel 100. The upper cover 410 is coupled with the lower cover 420 to overlap and support a front edge portion of the display panel 100.

The lower cover 420 is disposed under the backlight unit 200. The lower cover 420 may include a lower plate, and sidewalls which extend upward towards the upper cover 410 from the lower plate. The lower cover 420 provides a space to accommodate the display panel 100 and the backlight unit 200, such as within a space defined by the lower plate and the sidewalls thereof. In addition, the lower cover 420 is coupled with the upper cover 410 to accommodate the display panel 100 and the backlight unit 200 therein.

Figure 2:
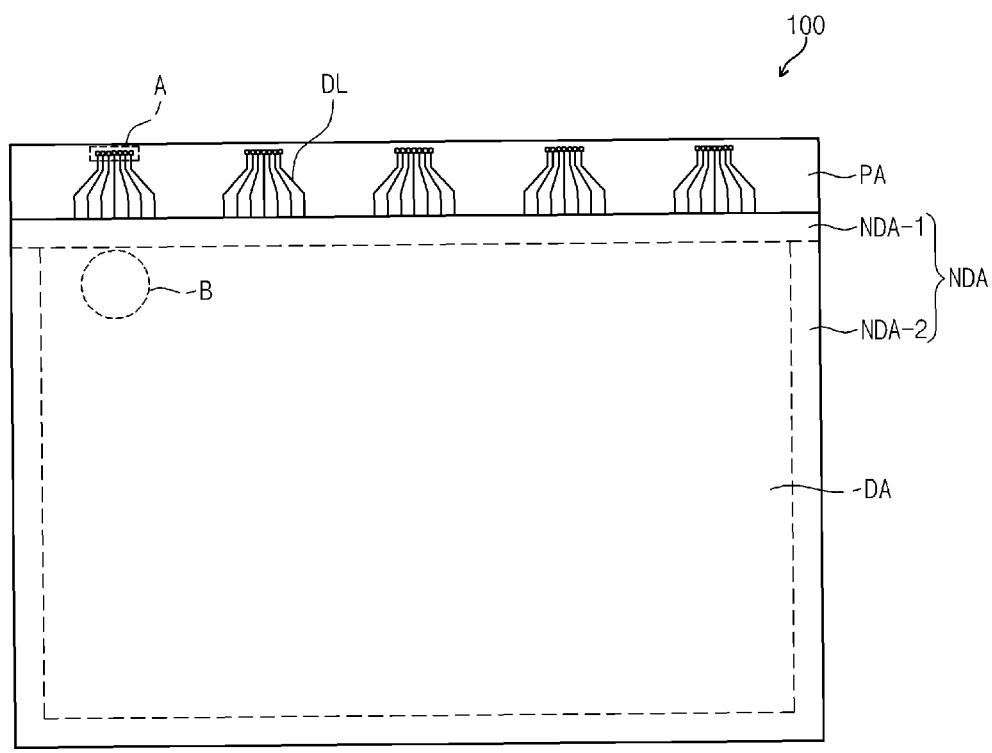
FIG. 2 is a plan view showing an exemplary embodiment of a display panel before a flexible printed circuit board is attached to the display panel.
Figure 3:
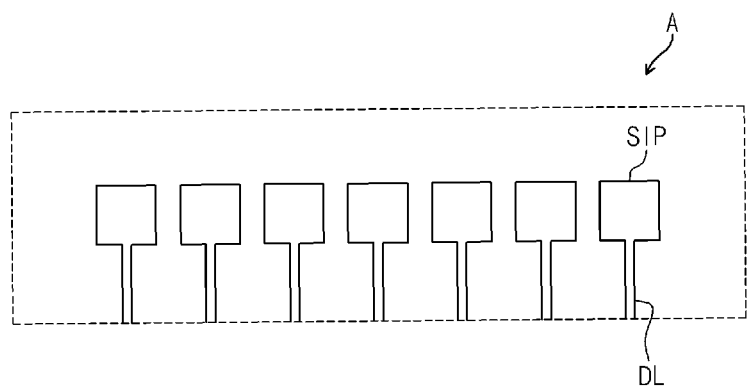
FIG. 3 is an enlarged view showing portion A of FIG. 2.
Figure 4:
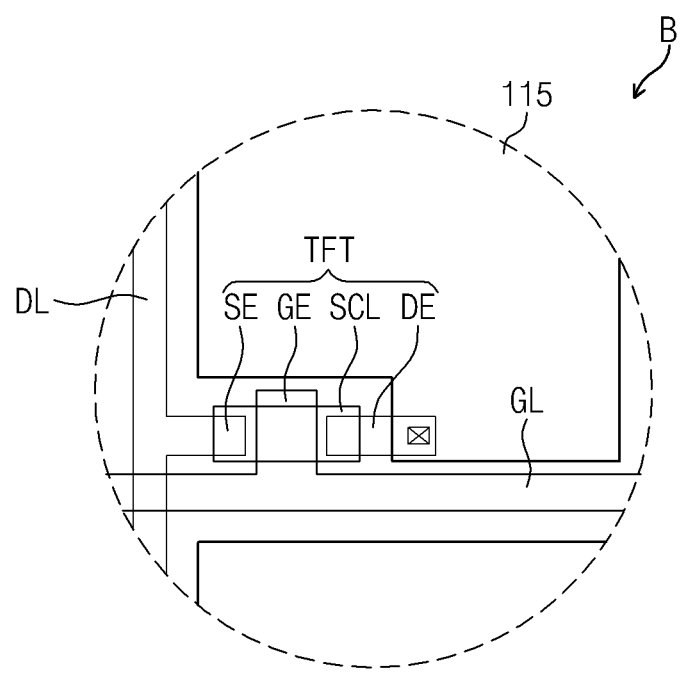
FIG. 4 is an enlarged view showing portion B of FIG. 2.
Figure 5:
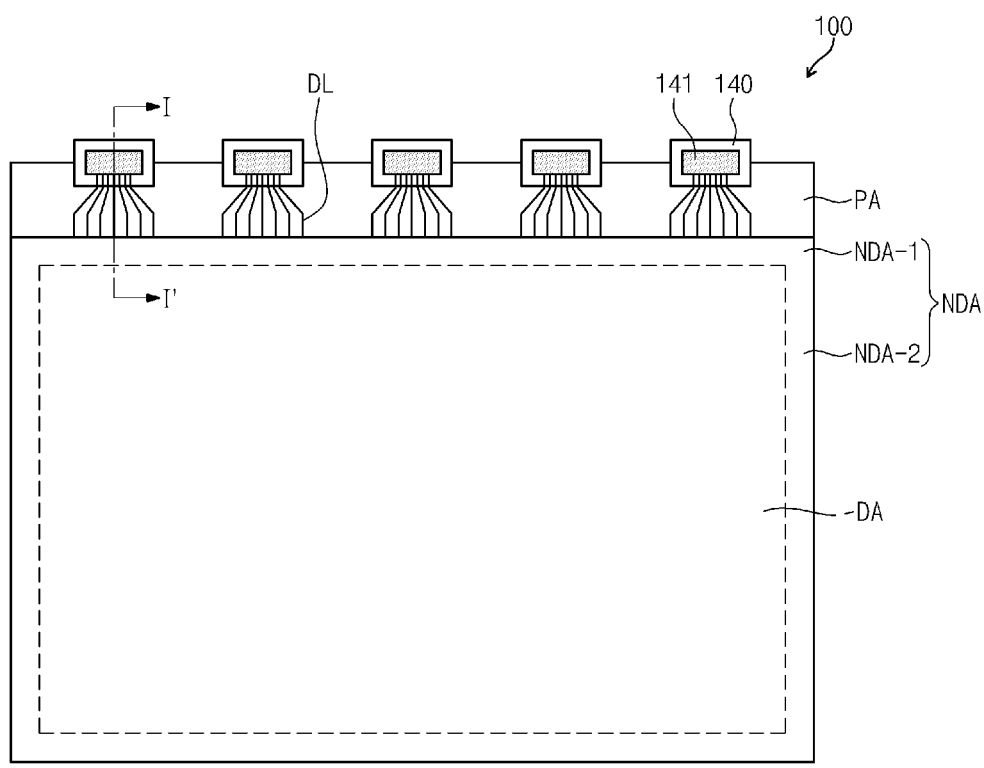
FIG. 5 is a plan view showing an exemplary embodiment of a display panel after a flexible printed circuit board is attached to the display panel.
Figure 6:
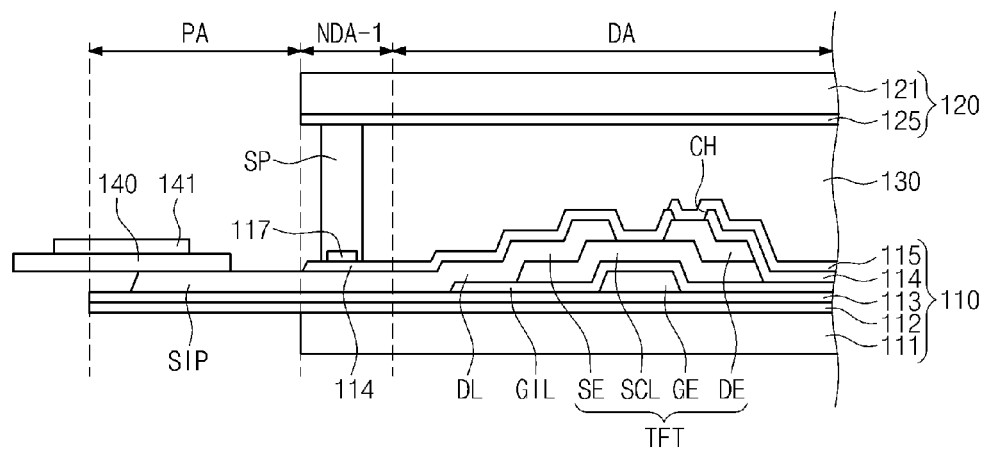
FIG. 6 is a cross-sectional view taken along line I-I' of FIG. 5.
Figure 7:
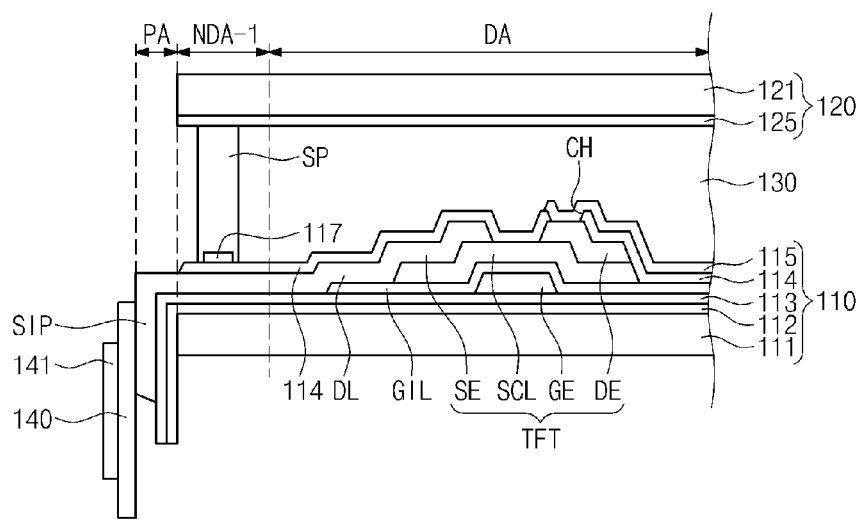
FIG. 7 is a cross-sectional view showing an exemplary embodiment of a pad area which is bent downward, of the display panel of FIG. 6.

FIG. 2 is a plan view showing an exemplary embodiment of a display panel before a flexible printed circuit board is attached to the display panel, FIG. 3 is an enlarged view showing portion A of FIG. 2, FIG. 4 is an enlarged view showing portion B of FIG. 2, FIG. 5 is a plan view showing an exemplary embodiment of a display panel after a flexible printed circuit board is attached to the display panel, FIG. 6 is a cross-sectional view taken along line I-I' of FIG. 5, and FIG. 7 is a cross-sectional view showing an exemplary embodiment of a pad area bent downward, of the display panel of FIG. 6.

Referring to FIGS. 2 to 7, the display panel 100 includes the display area DA, the non-display area NDA surrounding the display area DA, and the pad area PA extended from at least one side of the non-display area NDA. Here, the non-display area NDA includes a first non-display area NDA-1 adjacent to the pad area PA and a second non-display area NDA-2 except for (e.g., excluding) the first non-display area NDA-1. The pad area PA may also be considered a part of the non-display area NDA of the display panel 100.

In addition, the display panel 100 includes the array substrate 110, the opposite substrate 120 facing the array substrate 110, and the liquid crystal layer 130 disposed between the array substrate 110 and the opposite substrate 120.

The array substrate 110 has a planar shape substantially corresponding to that of the overall display panel 100, and thus includes the display area DA, the non-display area NDA and the pad area PA.

The pixels are arranged in the display area DA of the array substrate 110 in the matrix form, and each pixel includes the thin film transistor TFT and a pixel electrode 115.

A seal pattern SP is disposed in the non-display area NDA of the array substrate 110. The seal pattern SP is disposed to surround the display area DA and couples the array substrate 110 to the opposite substrate 120, so as to prevent the liquid crystal molecules of a liquid crystal layer 130 from leaking.

The pad area PA of the array substrate 110 includes a signal input pad SIP electrically and/or physically connected to the thin film transistor TFT.

In addition, the array substrate 110 includes a first base substrate 111, an organic polymer layer 112 disposed on the first base substrate 111, an insulating layer 113 disposed on the organic polymer layer 112, the thin film transistor TFT disposed on the insulating layer 113, and the pixel electrode 115 physically and/or electrically connected to the thin film transistor TFT.

The first base substrate 111 corresponds to the display area DA and the non-display area NDA, and has the rectangular plate shape with long sides and short sides. A planar dimension of the first base substrate 111 may be substantially the same as a sum of the display area DA and the non-display area NDA. That is, the first base substrate 111 does not overlap the pad area PA.

The first base substrate 111 includes a transparent insulating material and transmits the light therethrough. In addition, the first base substrate 111 may be a rigid type substrate, such as a glass substrate, a quartz substrate, a glass ceramic substrate, a crystalline glass substrate, etc., or may be a flexible type substrate, such as a film substrate containing the organic polymer layer, a plastic substrate, etc. In one exemplary embodiment, the materials used to form the first base substrate 111 have high heat-resistance when the first base substrate 111 is formed.

The organic polymer layer 112 is disposed on the first base substrate 111 to face the opposite substrate 120. In addition, the organic polymer layer 112 is disposed on the display area DA, the non-display area NDA and the pad area PA. That is, the first base substrate 111 is absent under the organic polymer layer 112 in the pad area PA.

In addition, the organic polymer layer 112 includes an organic polymer that transmits the light, e.g., polyethyleneterephthalate ("PET"), polyethylenenaphthalate (PEN), polycarbonate ("PC"), polyetherimide ("PEI"), polyethersulfone ("PES"), polyetheretherketone ("PEEK") or polyimide ("PI"), but is not limited thereto or thereby. Further, the organic polymer layer 112 has a thickness of about 3 micrometers to about 50 micrometers to support the signal input pad SIP which extends from the non-display area NDA.

The insulating layer 113 is disposed on the organic polymer layer 112. In addition, the insulating layer 113 includes an insulating material that transmits the light, e.g., silicon nitride (SiNx) or silicon oxide (SiOx), but is not limited thereto or thereby. The insulating layer 113 reduces or effectively prevents diffusion of the materials contained in the organic polymer layer 112 into the thin film transistor TFT, thereby reducing or effectively preventing deterioration of driving characteristics of the thin film transistor TFT.

The thin film transistor TFT is disposed on the insulating layer 113. The thin film transistor TFT includes a semiconductor layer SCL, a gate electrode GE, a source electrode SE and a drain electrode DE. In detail, the thin film transistor TFT includes the gate electrode GE disposed on the insulating layer 113, a gate insulating layer GIL covering the gate electrode GE, the semiconductor layer SCL disposed on the gate insulating layer GIL, and source and drain electrodes SE and DE physically and/or electrically connected to both ends of the semiconductor layer SCL. In the exemplary embodiment, the semiconductor layer SCL includes a channel area overlapped with the gate electrode GE when viewed in a plan view of the display panel 100, a source area making contact with the source electrode SE, and a drain area making contact with the drain electrode DE.

The gate electrode GE of the thin film transistor TFT is physically and/or electrically connected to the gate line GL that transmits a scan signal and/or a gate signal to the thin film transistor TFT. The gate electrode GE may be continuously extended from the gate line GL to be physically and/or electrically connected to the gate line GL. The source electrode SE is physically and/or electrically connected to the data line DL that transmits the data voltage to the thin film transistor TFT. The source electrode SE may be continuously extended from the data line DL, to be physically and/or electrically connected to the data line DL. The signal input pad SIP is physically and/or electrically connected to the data line DL. The signal input pad SIP may be continuously extended from the data line DL to be physically and/or electrically connected to the data line DL. The source electrode SE, the data line DL and the signal input pad SIP may collectively form a single, unitary, indivisible member.

As the above-mentioned thin film transistor TFT, a bottom gate thin film transistor TFT in which the gate electrode GE is disposed between the semiconductor layer SCL and the first base substrate 111 has been described, but the thin film transistor TFT is not limited to the bottom gate thin film transistor. That is, a top gate thin film transistor TFT in which the semiconductor layer SCL is between the gate electrode GE and the first base substrate 111 may be used as the above-mentioned thin film transistor TFT.

The protective layer 114 is disposed on the thin film transistor TFT. The protective layer 114 is provided with a contact hole CH extended through a thickness thereof, to expose a portion of the drain electrode DE. In addition, the protective layer 114 may have a multi-layer structure, but is not limited thereto or thereby. In one exemplary embodiment, for instance, the protective layer 114 may include an inorganic protective layer to cover the thin film transistor TFT and the gate insulating layer GIL, and an organic protective layer disposed on the inorganic protective layer. The organic protective layer removes a step-difference occurring due to the thin film transistor TFT to planarize an upper surface thereof.

The pixel electrode 115 is disposed on the protective layer 114 and is physically and/or electrically connected to the drain electrode DE through the contact hole CH. The pixel electrode 115 includes a transparent conductive oxide, such as indium tin oxide ("ITO") or indium zinc oxide ("IZO"), but is not limited thereto or thereby.

A common voltage pad 117 is disposed on the protective layer 114 in the first non-display area NDA-1. The common voltage pad 117 contacts the seal pattern SP and applies a common voltage to the common electrode 125. The common voltage pad 117 includes a transparent conductive oxide, e.g., indium tin oxide (ITO) or indium zinc oxide (IZO).

At least one of the gate line GL and the data line DL, for example, the data line DL, is physically and/or electrically extended to the pad area PA and connected to the signal input pad SIP to which an external signal is applied. That is, the signal input pad SIP may be disposed on the insulating layer 113 of the pad area PA.

The flexible printed circuit board 140 on which the driver IC 141 is mounted is physically and/or electrically connected to the signal input pad SIP. The driver IC 141 receives the various control signals from the external circuit module and outputs the driving signal to the thin film transistor TFT in response to the control signals to drive the display panel 100.

The opposite substrate 120 is disposed in the display area DA and the non-display area NDA. In addition, the opposite substrate 120 includes a second base substrate 121, and a common electrode 125 disposed on the second base substrate 121. The second base substrate 121 may be the rigid type substrate or the flexible type substrate, similar to the first base substrate 111. The common electrode 125 includes a transparent conductive oxide, similar to the pixel electrode 115. Further, the common electrode 125 applies a common voltage from an external source (not shown) to each pixel.

The liquid crystal layer 130 includes the liquid crystal molecules. The liquid crystal molecules are arranged in the specific direction by the electric field generated between the pixel electrode 115 and the common electrode 125 to control the transmittance of the light passing through the liquid crystal layer 130. Accordingly, the liquid crystal layer 130 transmits the light provided from the backlight unit 200 in response to the electric field, and thus the display panel 100 displays the image in the display area DA.

As described above, the first base substrate 111 and the second base substrate 121 do not exist in the pad area PA of the display panel 100. Additionally, the organic polymer layer 112, the insulating layer 113, the signal input pad SIP and the flexible printed circuit board 140 do exist in the pad area PA. Referring to FIG. 6, the display panel 100 has an overall planar dimension and shape including planar areas of the organic polymer layer 112, the insulating layer 113, the signal input pad SIP and a portion of the flexible printed circuit board 140 within the pad area PA. Each of the organic polymer layer 112, the insulating layer 113 the signal input pad SIP may have relatively smaller thickness than a planar width of the pad area PA.

Referring to FIG. 7, since the signal input pad SIP is disposed on the organic polymer layer 112 and the insulating layer 113, the pad area PA may have a thin film profile. Thus, the signal input pad SIP, the organic polymer layer 112 and the insulating layer 113 within the pad area PA may be bent toward the backlight unit 200, so that a planar width of the pad area PA of the display panel 100 may be reduced. That is, the planar width of the pad area PA may be defined by thicknesses of the organic polymer layer 112, the insulating layer 113 and the signal input pad SIP, taken from an outer edge of the non-display area NDA, instead of being defined by planar areas of the organic polymer layer 112, the insulating layer 113 and the signal input pad SIP.

In addition, when the display apparatus employs the exemplary embodiment of display panel 100, a planar size of the upper cover 410 and the lower cover 420 that accommodate the display panel 100 therebetween may be reduced by the reduction in the planar width of the pad area PA.

FIGS. 8 to 12 are cross-sectional views explaining an exemplary embodiment of a method of manufacturing a display panel shown in FIGS. 6 and 7.

Figure 8:
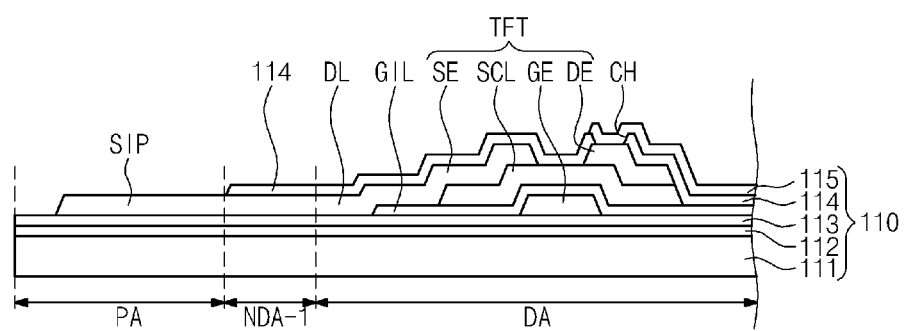
FIGS. 8 to 12 are cross-sectional views explaining an exemplary embodiment of a method of manufacturing the display panel shown in FIGS. 6 and 7.

Referring to FIG. 8, the array substrate 110 is manufactured. The array substrate 110 includes the display area DA, the non-display area NDA surrounding the display area DA, and the pad area PA extended from at least one side of the non-display area NDA. Here, the non-display area NDA includes the first non-display area NDA-1 adjacent to the pad area PA, and the second non-display area NDA-2 except for the first non-display area NDA-1.

In addition, the array substrate 110 includes the first base substrate 111, the organic polymer layer 112 disposed on the first base substrate 111, the insulating layer 113 disposed on the organic polymer layer 112, the thin film transistor TFT disposed on the insulating layer 113, and the pixel electrode 115 physically and/or electrically connected to the thin film transistor TFT.

The method of manufacturing the array substrate 110 is as follows.

The first base substrate 111 is prepared. The first base substrate 111 transmits the light and has the rectangular plate shape with long sides and short sides. In addition, the first base substrate 111 is divided into the display area DA, the non-display area NDA and the pad area PA.

The organic polymer layer 112 is formed over an entire surface of the first base substrate 111 to have the thickness of about 3 micrometers to about 50 micrometers taken perpendicular to the first base substrate 111. The organic polymer layer 112 may be formed by various methods, e.g., a slit coating method, a spin coating method, a roll coating method, an inkjet coating method, etc. That is, the organic polymer layer 112 is divided into the display area DA, the non-display area NDA and the pad area PA, similar to the first base substrate 111.

The organic polymer layer 112 is formed using at least one of an organic polymer that transmits the light, e.g., polyethyleneterephthalate ("PET"), polyethylenenaphthalate ("PEN"), polycarbonate ("PC"), polyetherimide ("PEI"), polyethersulfone ("PES"), polyetheretherketone ("PEEK") or polyimide ("PI").

The insulating layer 113 is formed on the organic polymer layer 112. The insulating layer 113 is formed of at least one of silicon nitride (SiNx) or silicon oxide (SiOx) to transmit the light, but is not limited thereto or thereby. In addition, the insulating layer 113 may be formed by a physical vapor deposition method or a chemical vapor deposition method, but is not limited thereto or thereby.

The insulating layer 113 has superior adhesive force with respect to a metal material. Therefore, the insulating layer 113 may reduce or effectively prevent detachment of a metal layer, which occurs when the metal material of the thin film transistor TFT is directly deposited on the organic polymer layer 112.

In addition, the insulating layer 113 may reduce or effectively prevent diffusion of the material contained in the organic polymer layer 112 into the thin film transistor TFT. Accordingly, the insulating layer 113 reduces or effectively prevents deterioration of the driving characteristics of the thin film transistor TFT.

The thin film transistor TFT is formed on the insulating layer 113. The thin film transistor TFT includes the gate electrode GE, the semiconductor layer SCL, the source electrode SE and the drain electrode DE.

According to the method of forming the thin film transistor TFT, the gate electrode GE is formed on the insulating layer 113, and the gate insulating layer GIL is formed on the insulating layer 113 to cover the gate electrode GE. The semiconductor layer SCL is formed on the gate insulating layer GIL. The source electrode SE and the drain electrode DE are respectively formed in the source area and the drain area of the semiconductor layer SCL. The channel area of the thin film transistor TFT is disposed between the source area and the drain area.

In addition, the data line DL physically and/or electrically connected to the source electrode SE and the signal input pad SIP physically and/or electrically connected to the data line DL, which are disposed on the insulating layer 113 of the pad area PA, may be substantially simultaneously formed with the source electrode SE and the drain electrode DE. Since the data line DL, the source electrode SE, the signal input pad SIP and the drain electrode DE may be substantially simultaneously formed, these elements may be considered formed from a same layer or formed in a same layer of the array substrate 110.

The protective layer 114 is formed to cover the thin film transistor TFT. The protective layer 114 is formed of the inorganic material, the organic material or the organic-inorganic material, but is not limited thereto or thereby.

The protective layer 114 is partially removed to form the contact hole CH through which the portion of the drain electrode DE is exposed.

A transparent conductive oxide is deposited on the protective layer 114 and patterned. Accordingly, the pixel electrode 115 is formed to be electrically connected to the drain electrode DE of the thin film transistor TFT through the contact hole CH. The common voltage pad 117 is formed in the first non-display area NDA-1 by a patterning process.

Figure 9:
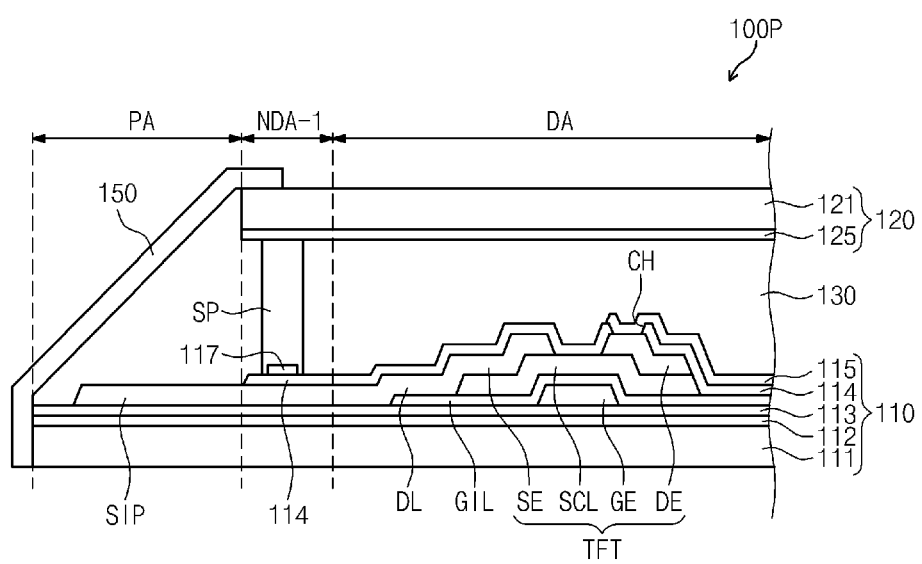

Referring to FIG. 9, after the array substrate 110 is manufactured, the seal pattern SP is formed in the non-display area NDA to surround the display area DA.

The seal pattern SP is disposed between the array substrate 110 and the opposite substrate 120 in the non-display area NDA. The seal pattern SP disposed to surround the display area DA couples the array substrate 110 to the opposite substrate 120 and reduces or prevents leaking of the liquid crystal molecules of the liquid crystal layer 130.

The sealant pattern SP has conductivity and makes contact with the common electrode 125 to apply the common voltage to each pixel. In one exemplary embodiment, for instance, the seal pattern SP may include a mixture of a polymer resin including at least one of an epoxy-containing resin, a phenol-containing resin or an acryl-containing resin, a conductive particle including at least one of gold, silver, copper or aluminum, and an organic binder.

After the seal pattern SP is formed, the liquid crystal layer 130 including the liquid crystal molecules is disposed in the display area DA.

Then, the opposite substrate 120 that includes the second base substrate 121, and the common electrode 125 disposed on the second base substrate 121 is prepared. In the exemplary embodiment, the opposite substrate 120 is divided into the display area DA and the non-display area NDA.

The opposite substrate 120 is disposed such that the common electrode 125 faces the array substrate 110. The array substrate 110 and the opposite substrate 120 are coupled to each other by the seal pattern SP.

In the exemplary embodiment, after the seal pattern SP is formed and the liquid crystal layer 130 is disposed, the array substrate 110 and the opposite substrate 120 are coupled to each other, but should not be limited thereto or thereby. In one exemplary embodiment, for instance, the liquid crystal molecules are injected between the array substrate 110 and the opposite substrate 120 to form the liquid crystal layer 130 after the seal pattern SP is formed and the array substrate 110 and the opposite substrate 120 are coupled to each other.

When heat or light is irradiated to the seal pattern SP after the array substrate 110 and the opposite substrate 120 are coupled to each other, the seal pattern SP is cured so as to manufacture an initial display panel 100P.

After the seal pattern SP is cured, the first base substrate 111 is removed from the pad area PA, such as by using a laser cutting method or a wet etch method. In the exemplary embodiment, the first base substrate 111 in the pad area PA is removed by using the wet etch method.

Figure 10:
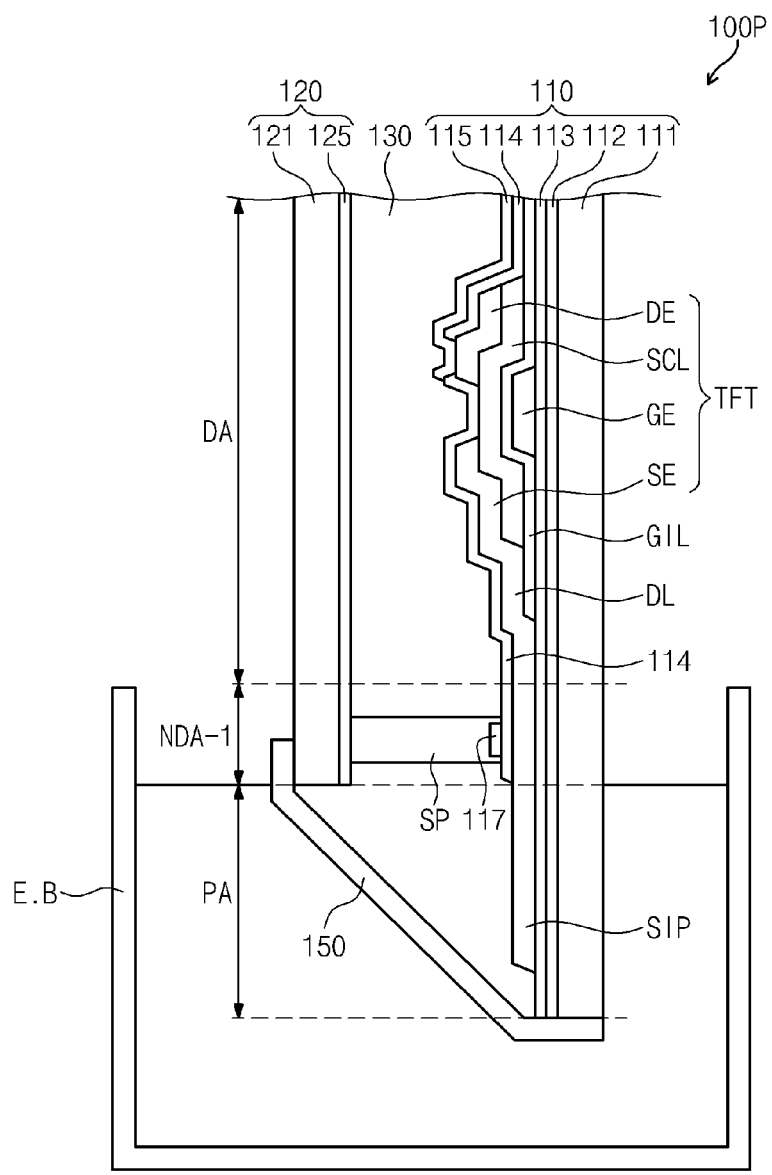

Referring to FIG. 10, a protective film 150 is attached to an end of the initial display panel 100P. In one exemplary embodiment, for example, the protective film 150 is attached to the pad area PA of the array substrate 110 and the non-display area NDA of the opposite substrate 120.

After the protective film 150 is attached, the initial display panel 100P is immersed into an etching bath E.B including an etchant material. As illustrated in the exemplary embodiment, the initial display panel 100P is immersed into the etching bath E.B such that the protective film 150 faces downward. In addition, the initial display panel 100P is immersed into the etchant by a depth equal to or more than the planar width of the pad area PA and equal to or less than a sum of the planar width of the pad area PA and the planar width of the non-display area NDA.

Figure 11:
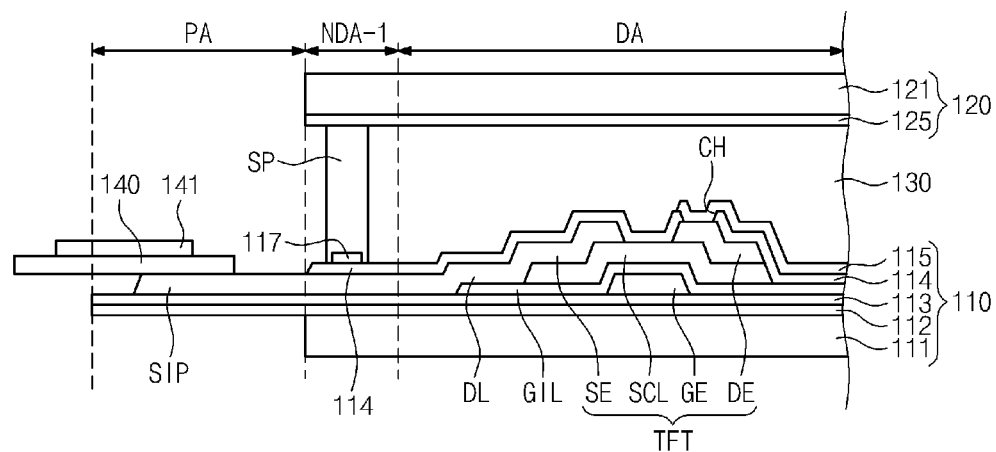

When the initial display panel 100P is immersed into the etching bath E.B, the first base substrate 111 in the pad area PA is removed by the etchant. Accordingly, only the organic polymer layer 112, the insulating layer 113 and the signal input pad SIP exist in the pad area PA of the display panel 100 as shown in FIG. 11.

Figure 12:
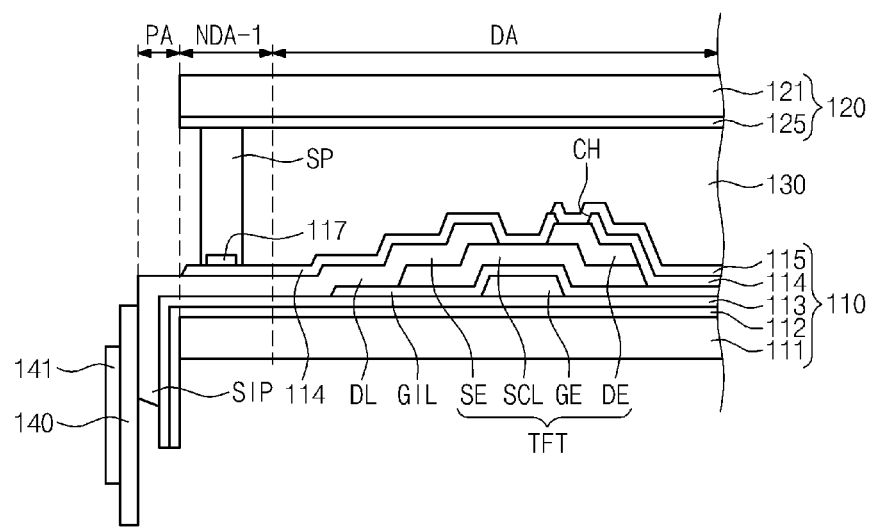

Referring to FIG. 12, after removing a portion of the first base substrate 111 within the pad area PA, the protective film 150 is removed. The flexible printed circuit board 140 connected to the external circuit module is attached to the signal input pad SIP of the pad area PA to electrically connect the signal input pad SIP to the driver IC 141, thereby manufacturing the display panel 100.

When the signal input pad SIP is connected to the flexible printed circuit board 140, the pad area PA is bent toward the backlight unit 200.

With the pad area PA is bent toward the backlight unit 200, the display panel 100 and the backlight unit 200 are accommodated in the space between the upper cover 410 and the lower cover 420.

According to the display panel 100 manufactured by the above-mentioned processes, the pad area PA may be bent toward the backlight unit 200. Thus, the planar space required for the pad area PA of in the display panel 100 may be reduced.

Hereinafter, display panels according to other exemplary embodiments will be described with reference to FIGS. 13 to 23. In FIGS. 13 to 23, the same reference numerals denote the same elements in FIGS. 1 to 12, and thus detailed descriptions of the same elements will be omitted in order to avoid redundancy.

Figure 13:
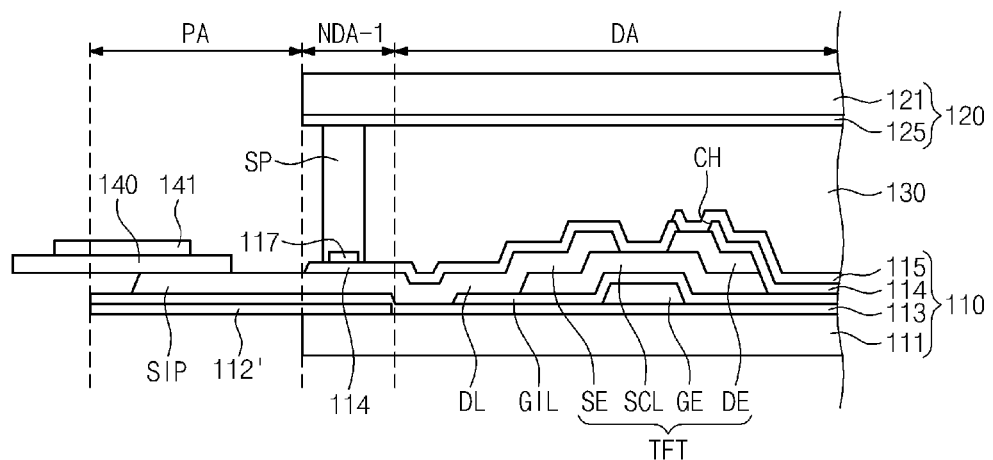
FIG. 13 is a cross-sectional view showing another exemplary embodiment of a display panel according to the invention.
Figure 14:
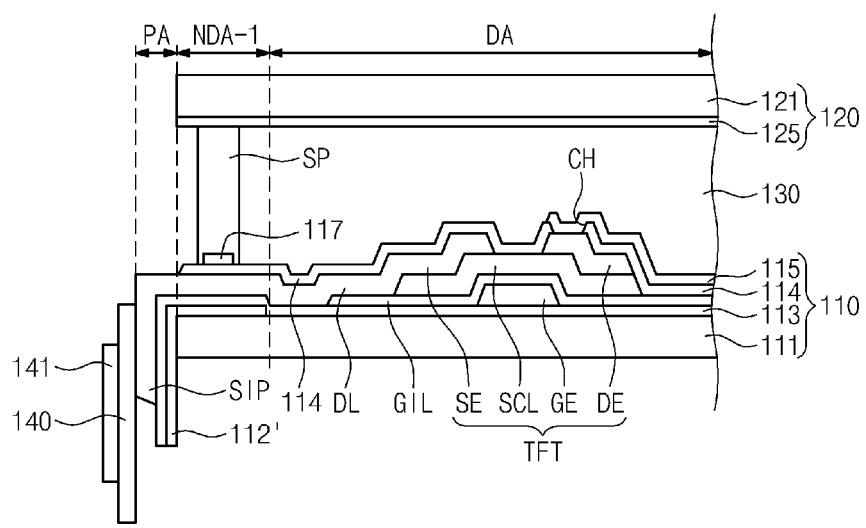
FIG. 14 is a cross-sectional view showing an exemplary embodiment of a pad area which is bent downward, of the display panel of FIG. 13.

FIG. 13 is a cross-sectional view showing another exemplary embodiment of a display panel according to the invention and FIG. 14 is a cross-sectional view showing an exemplary embodiment of a pad area bent downward, of the display panel of FIG. 13.

Referring to FIGS. 13 and 14, the display panel 100 includes the display area DA, the non-display area NDA surrounding the display area DA, and the pad area PA extended from at least one side of the non-display area NDA. Here, the non-display area NDA includes the first non-display area NDA-1 adjacent to the pad area PA, and the second non-display area NDA-2 except for the first non-display area NDA-1. The pad area PA may also be considered a part of the non-display area NDA of the display panel 100.

In addition, the display panel 100 includes the array substrate 110, the opposite substrate 120 facing the array substrate 110, and the liquid crystal layer 130 disposed between the array substrate 110 and the opposite substrate 120.

The array substrate 110 has a planar shape substantially corresponding to that of the overall display panel 100, and thus includes the display area DA, the non-display area NDA and the pad area PA. In addition, the array substrate 110 includes the first base substrate 111, an organic polymer layer 112' disposed on a portion of the first base substrate 111, an insulating layer 113 disposed on the organic polymer layer 112' and on the first base substrate 111, the thin film transistor TFT disposed on the insulating layer 113, and the pixel electrode 115 physically and/or electrically connected to the thin film transistor TFT.

The organic polymer layer 112' may be disposed in the pad area PA and the first non-display area NDA-1. That is, the first base substrate 111 does not exist under the organic polymer layer 112' in the pad area PA. In addition, the organic polymer layer 112' does not overlap with the display area DA. Since the organic polymer layer 112' is not overlapped with the display area DA, the organic polymer layer 112' may include colored materials. Accordingly, the organic polymer layer 112' may reduce or effectively prevent leaking of the light traveling to the display area DA an area of the display panel 100 other than the display area DA.

The insulating layer 113 covers the organic polymer layer 112' and the first base substrate 111. That is, the insulating layer 113 covers the display area DA, the non-display area NDA and the pad area PA.

The thin film transistor TFT is disposed on the insulating layer 113. The thin film transistor includes the semiconductor layer SCL, the gate electrode GE, the source electrode SE and the drain electrode DE. The source electrode SE makes contact with the data line DL that transmits the data voltage to the thin film transistor TFT.

The protective layer 114 is disposed on the thin film transistor TFT. The protective layer 114 is provided with the contact hole CH extended through a thickness thereof, to expose a portion of the drain electrode DE.

The pixel electrode 115 is disposed on the protective layer 114 and is physically and/or electrically connected to the drain electrode DE through the contact hole CH.

The seal pattern SP is disposed between the array substrate 110 and the opposite substrate 120 in the non-display area NDA.

The source electrode SE is physically and/or electrically connected to the data line DL, and the data line DL is continuously extended to the pad area PA to be physically and/or electrically connected to the signal input pad SIP. In other words, the signal input pad SIP is disposed on the insulating layer 113 in the pad area PA. The signal input pad SIP is physically and/or electrically connected to the flexible printed circuit board 140 on which the driver IC connected to the external circuit module is mounted.

Figure 15:
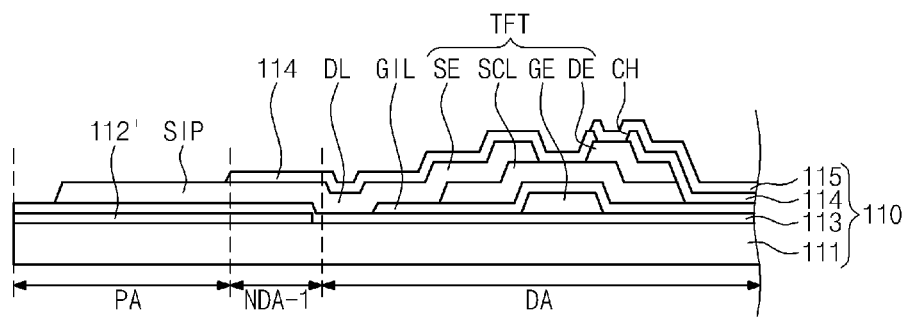
FIGS. 15 to 17 are cross-sectional views explaining an exemplary embodiment of a method of manufacturing the display panel shown in FIGS. 13 and 14.
Figure 16:
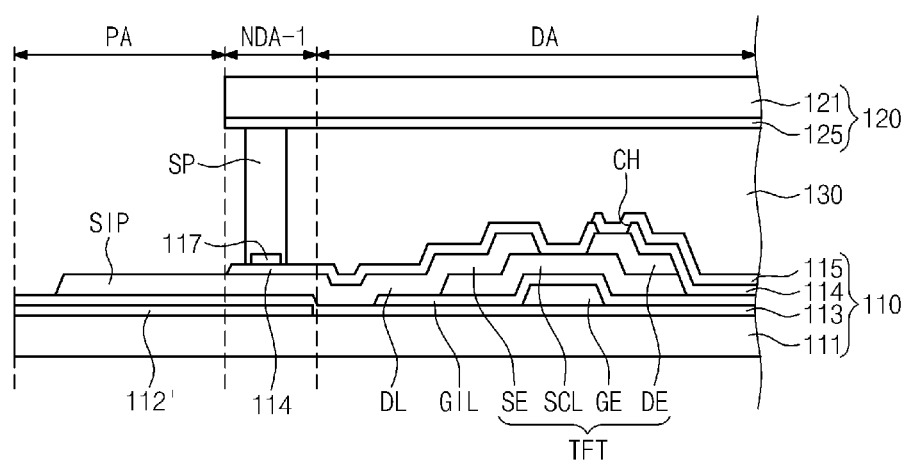
Figure 17:
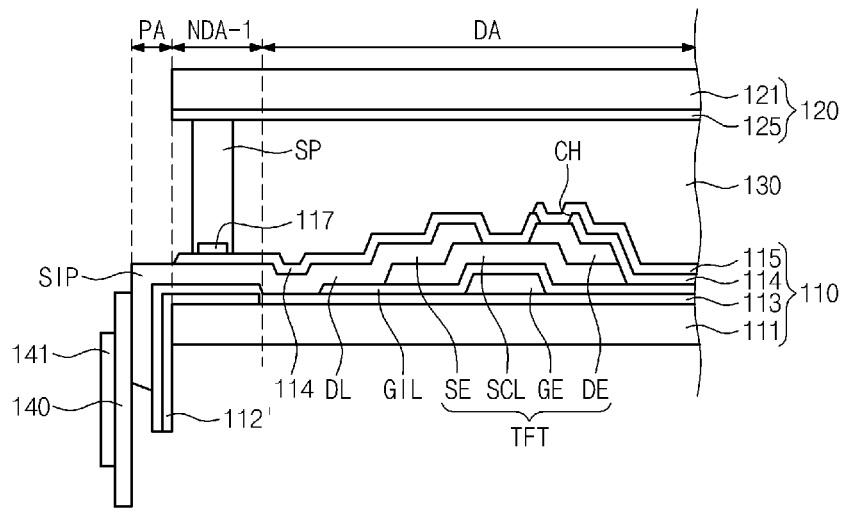

FIGS. 15 to 17 are cross-sectional views explaining an exemplary embodiment of a method of manufacturing a display panel shown in FIGS. 13 and 14.

Referring to FIG. 15, the array substrate 110 is manufactured. The array substrate 110 includes the display area DA, the non-display area NDA and the pad area PA. Here, the non-display area NDA includes the first non-display area NDA-1 adjacent to the pad area PA and the second non-display area NDA-2 except for the first non-display area NDA-1.

In addition, the array substrate 110 includes the first base substrate 111, the organic polymer layer 112' disposed on the portion of the first base substrate 111, the insulating layer 113 disposed on the organic polymer layer 112', the thin film transistor TFT disposed on the insulating layer 113, and the pixel electrode 115 physically and/or electrically connected to the thin film transistor TFT.

The organic polymer layer 112' is disposed only in the pad area PA and the first non-display area NDA-1 of the first base substrate 111.

The method of manufacturing the array substrate 110 is as follows.

The first base substrate 111 is prepared. The first base substrate 111 transmits the light and has the rectangular plate shape with long sides and short sides.

An organic polymer material is formed over an entire surface of the first base substrate 111. The organic polymer material is patterned to form the organic polymer layer 112'. In one exemplary embodiment, for instance, the organic polymer material is removed from areas of the first base substrate 111 except for the pad area PA and the first non-display area NDA-1. The organic polymer layer 112' may be disposed only in the pad area PA and the first non-display area NDA-1 of the first base substrate 111, but is not limited thereto or thereby. In addition the organic polymer material may be patterned by an etching method or a laser cutting method, but is not limited thereto or thereby.

Further, the organic polymer layer 112' may be formed only in the pad area PA and the first non-display area NDA-1 using a roll coating method, an inkjet coating method, or a screen coating method, but is not limited thereto or thereby.

The insulating layer 113 is formed on the organic polymer layer 112' and the first base substrate 111. The insulating layer 113 is formed of at least one silicon nitride (SiNx) or silicon oxide (SiOx), but is not limited thereto or thereby.

The thin film transistor TFT is formed on the insulating layer 113. The thin film transistor TFT includes the gate electrode GE, the semiconductor layer SCL, the source electrode SE and the drain electrode DE.

The gate insulating layer GIL is formed between the gate electrode GE and the semiconductor layer SCL. The gate insulating layer GIL insulates the gate electrode GE from the semiconductor SCL, the source electrode SE and the drain electrode DE, respectively.

The data line DL physically and/or electrically connected to the source electrode SE and the signal input pad SIP physically and/or electrically connected to the data line DL, which are disposed on the insulating layer 113 of the pad area PA, may be substantially simultaneously formed with the source electrode SE and the drain electrode DE.

The protective layer 114 is formed to cover the thin film transistor TFT.

The protective layer 114 is partially removed to form the contact hole CH through which the portion of the drain electrode DE is exposed.

The pixel electrode 115 is formed to be physically and/or electrically connected to the drain electrode DE of the thin film transistor TFT through the contact hole CH.

Referring to FIG. 16, after the array substrate 110 is manufactured, the seal pattern SP is formed in the non-display area NDA of the array substrate 110. The seal pattern SP has conductivity and is cured by heat or light.

After the seal pattern SP is formed, the liquid crystal layer 130 including the liquid crystal molecules is disposed in the display area DA.

Then, the opposite substrate 120 that includes the second base substrate 121, and the common electrode 125 disposed on the second base substrate 121 is prepared. The opposite substrate 120 is disposed such that the common electrode 125 faces the array substrate 110. The array substrate 110 and the opposite substrate 120 are coupled to each other by the seal pattern SP.

When heat or light is irradiated to the seal pattern SP after the array substrate 110 and the opposite substrate 120 are coupled to each other, the seal pattern SP is cured.

Referring to FIG. 17, after the seal pattern SP is cured, a portion of the first base substrate 111 is removed from the pad area PA, such as by using the laser cutting method or the etching method.

After removing a portion of the first base substrate 111 within the pad area PA, the flexible printed circuit board 140 is attached to the pad area PA to electrically connect the signal input pad SIP to the driver IC 141.

When the signal input pad SIP is connected to the flexible printed circuit board 140, the pad area PA is bent.

With the pad area PA bent, the display panel 100 and the backlight unit 200 are accommodated in the space between the upper cover 410 and the lower cover 420.

Figure 18:
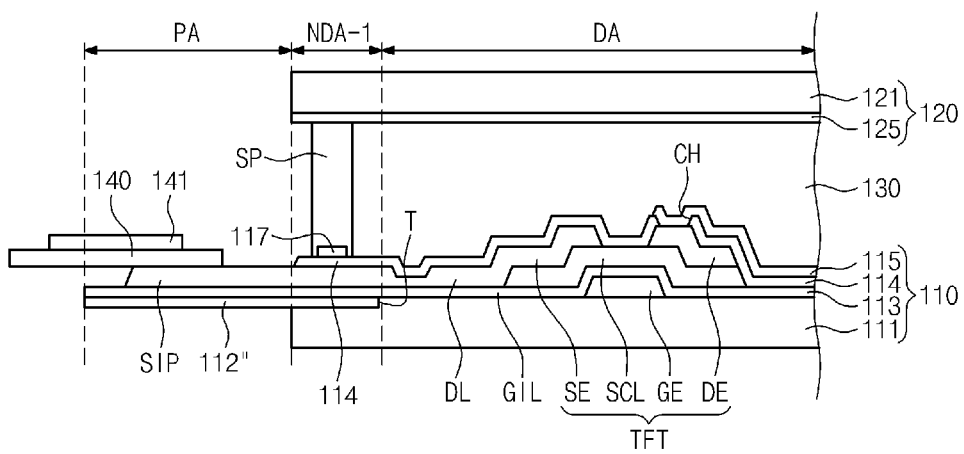
FIG. 18 is a cross-sectional view showing another exemplary embodiment of a display panel according to the invention.
Figure 19:
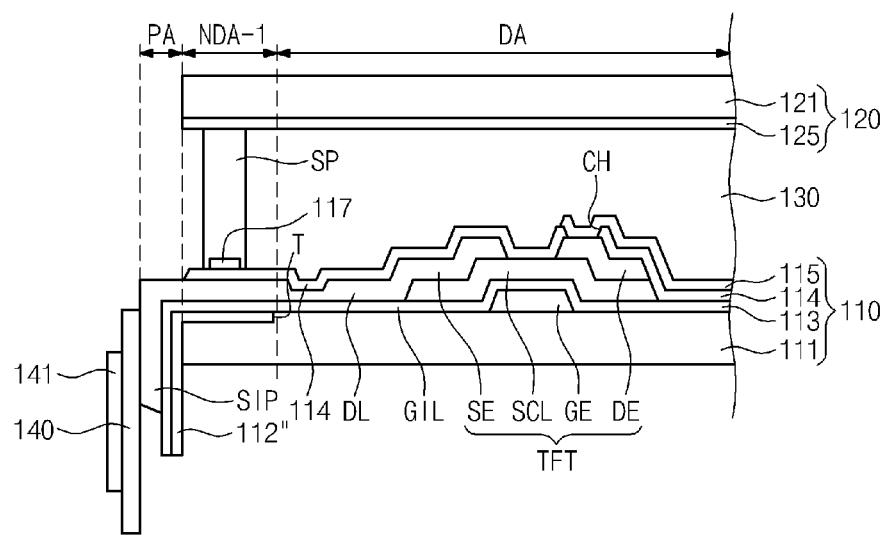
FIG. 19 is a cross-sectional view showing an exemplary embodiment of a pad area which is bent downward, of the display panel of FIG. 18.

FIG. 18 is a cross-sectional view showing another exemplary embodiment of a display panel according to the invention and FIG. 19 is a cross-sectional view showing an exemplary embodiment of a pad area bent downward, of the display panel of FIG. 18.

Referring to FIGS. 18 and 19, the display panel 100 includes the display area DA, the non-display area NDA surrounding the display area DA, and the pad area PA extended from at least one side of the non-display area NDA. Here, the non-display area NDA includes the first non-display area NDA-1 adjacent to the pad area PA and the second non-display area NDA-2 except for the first non-display area NDA-1. The pad area PA may also be considered a part of the non-display area NDA of the display panel 100.

In addition, the display panel 100 includes the array substrate 110, the opposite substrate 120 facing the array substrate 110, and the liquid crystal layer 130 disposed between the array substrate 110 and the opposite substrate 120.

The array substrate 110 has a planar shape substantially corresponding to that of the overall display panel 100, and thus includes the display area DA, the non-display area NDA, and the pad area PA. In addition, the array substrate 110 includes the first base substrate 111, an organic polymer layer 112" disposed on a portion of the first base substrate 111, an insulating layer 113 disposed on the organic polymer layer 112" and on the first base substrate 111, the thin film transistor TFT disposed on the insulating layer 113, and the pixel electrode 115 physically and/or electrically connected to the thin film transistor TFT.

The first base substrate 111 is disposed in the display area DA and the non-display area NDA and has the rectangular plate shape with long sides and short sides. In addition, the first base substrate 111 includes a trench T or stepped portion recessed from an upper surface of the first base substrate 111 and adjacent to the pad area PA. The trench T has a concave shape. In one exemplary embodiment the trench T may be formed by removing a portion of the first base substrate 111 in the non-display area NDA.

The organic polymer layer 112" may be disposed in the pad area PA and the first non-display area NDA-1. In addition, the organic polymer layer 112" may be disposed in the trench T of the first non-display area NDA-1. In the pad area PA, the first base substrate 111 does not exist under the organic polymer layer 112". In addition, the organic polymer layer 112" does not overlap with the display area DA.

The insulating layer 113 covers the organic polymer layer 112" and the first base substrate 111.

The thin film transistor TFT is disposed on the insulating layer 113. The thin film transistor TFT includes the semiconductor layer SCL, the gate electrode GE, the source electrode SE and the drain electrode DE. The source electrode SE makes contact with the data line DL that transmits the data voltage to the thin film transistor TFT.

The protective layer 114 is disposed on the thin film transistor TFT. The protective layer 114 is provided with the contact hole CH extended through a thickness thereof, to expose a portion of the drain electrode DE.

The pixel electrode 115 is disposed on the protective layer 114 and is physically and/or electrically connected to the drain electrode DE through the contact hole CH.

The seal pattern SP is disposed between the array substrate 110 and the opposite substrate 120 in the non-display area NDA.

The source electrode SE is physically and/or electrically connected to the data line DL, and the data line DL is continuously extended to the pad area PA to be physically and/or electrically connected to the signal input pad SIP. In other words, the signal input pad SIP is disposed on the insulating layer 113 in the pad area PA. The signal input pad SIP is physically and/or electrically connected to the flexible printed circuit board 140 on which the driver IC connected to the external circuit module is mounted.

FIGS. 20 to 23 are cross-sectional view explaining an exemplary embodiment of a method of manufacturing a display panel shown in FIGS. 18 and 19.

First, the array substrate 110 is manufactured. The array substrate 110 includes the display area DA, the non-display area NDA and the pad area PA. Here, the non-display area NDA includes the first non-display area NDA-1 adjacent to the pad area PA and the second non-display area NDA-2 except for the first non-display area NDA-1. In addition, the array substrate 110 includes the first base substrate 111, the organic polymer layer 112" disposed on the portion of the first base substrate 111, the insulating layer 113 disposed on the organic polymer layer 112", the thin film transistor TFT disposed on the insulating layer 113, and the pixel electrode 115 physically and/or electrically connected to the thin film transistor TFT.

The organic polymer layer 112" is disposed only in the pad area PA and the first non-display area NDA-1 of the first base substrate 111.

The method of manufacturing the array substrate 110 is as follows.

Figure 20:
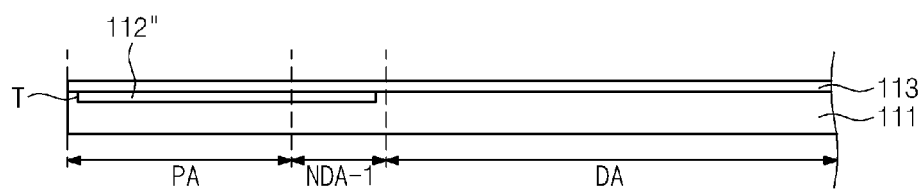
FIGS. 20 to 23 are cross-sectional view explaining an exemplary embodiment of a method of manufacturing the display panel shown in FIGS. 18 and 19.

Referring to FIG. 20, the first base substrate 111 is prepared. The first base substrate 111 transmits the light and has the rectangular plate shape with long sides and short sides.

A portion of the first base substrate 111 in the pad area PA and the first non-display area NDA-1 is removed to form the trench T.

The organic polymer layer 112" is formed to fill the trench T. The organic polymer layer 112" is formed by coating an organic polymer material on the first base substrate 111 and removing the organic polymer material except for the organic polymer material in the trench T. Accordingly, the organic polymer layer 112" may be disposed in the pad area PA and the first non-display area NDA-1 of the trench T.

The insulating layer 113 is formed on the organic polymer layer 112" and the first base substrate 111. The insulating layer 113 is formed of at least one of silicon nitride (SiNx) or silicon oxide (SiOx), but is not limited thereto or thereby.

Figure 21:
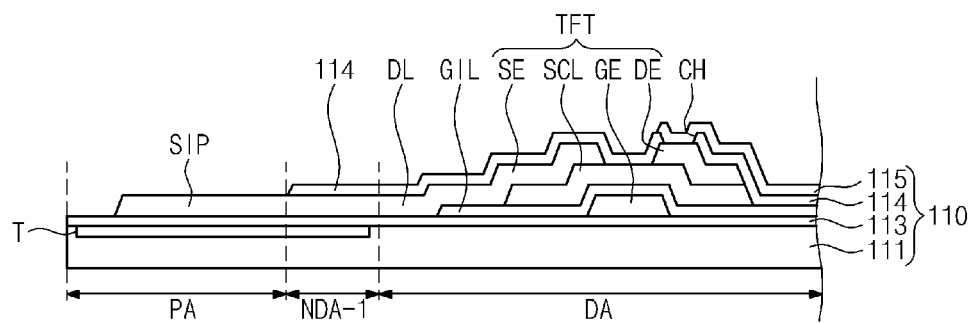

Referring to FIG. 21, the thin film transistor TFT is formed on the insulating layer 113. The thin film transistor TFT includes the gate electrode GE, the semiconductor layer SCL, the source electrode SE and the drain electrode DE.

The gate insulating layer GIL is formed between the gate electrode GE and the semiconductor layer SCL. The gate insulating layer GIL insulates the gate electrode GE from the semiconductor SCL, the source electrode SE and the drain electrode DE.

The data line DL physically and/or electrically connected to the source electrode SE and the signal input pad SIP physically and/or electrically connected to the data line DL, which are disposed on the insulating layer 113 of the pad area PA, may be substantially simultaneously formed with the source electrode SE and the drain electrode DE.

The protective layer 114 is formed to cover the thin film transistor TFT.

Then, the protective layer 114 is partially removed to form the contact hole CH through which the portion of the drain electrode DE is exposed.

The pixel electrode 115 is formed to be physically and/or electrically connected to the drain electrode DE of the thin film transistor TFT through the contact hole CH so as to manufacture the array substrate 110.

Figure 22:
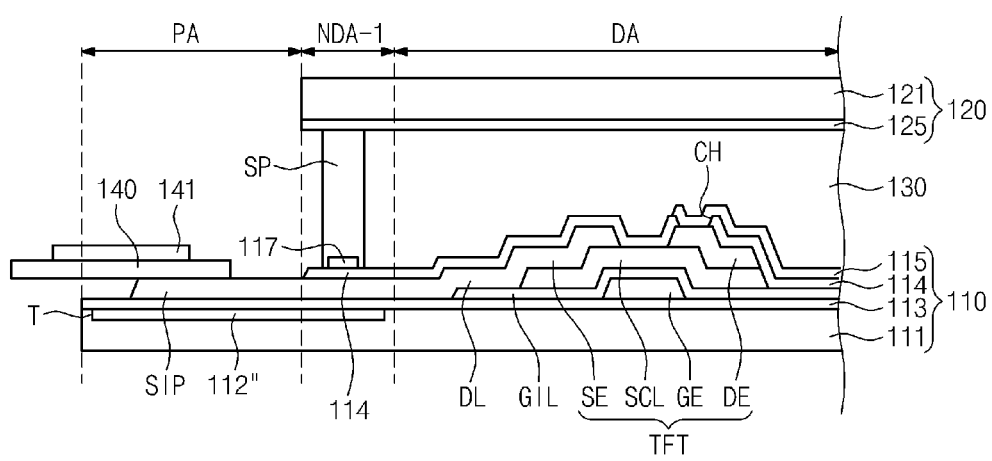

Referring to FIG. 22, after the array substrate 110 is manufactured, the seal pattern SP is formed in the non-display area NDA of the array substrate 110. The seal pattern SP has conductivity and is cured by heat or light.

After the seal pattern SP is formed, the liquid crystal layer 130 including the liquid crystal molecules is disposed in the display area DA.

Then, the opposite substrate 120 that includes the second base substrate 121, and the common electrode 125 disposed on the second base substrate 121 is prepared. The opposite substrate 120 is disposed such that the common electrode 125 faces the array substrate 110. The array substrate 110 and the opposite substrate 120 are coupled to each other by the seal pattern SP.

When heat or light is irradiated to the seal pattern SP after the array substrate 110 and the opposite substrate 120 are coupled to each other, the seal pattern SP is cured.

Figure 23:
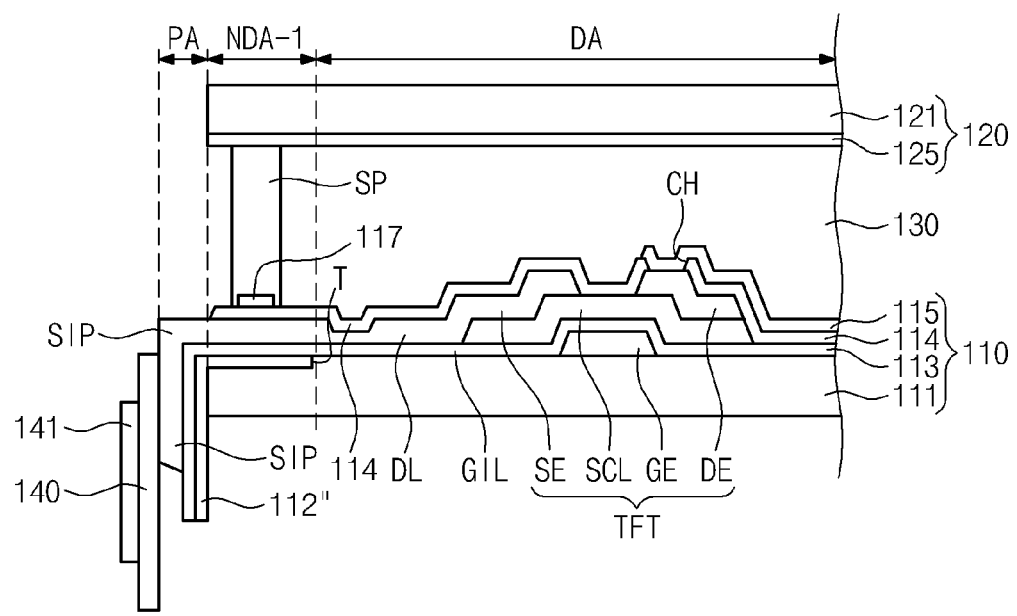

Referring to FIG. 23, after the seal pattern SP is cured, a portion of the first base substrate 111 is removed from the pad area PA.

After removing the portion of the first base substrate 111 within the pad area PA, the flexible printed circuit board 140 is attached to the pad area PA to electrically connect the signal input pad SIP to the driver IC 141.

When the signal input pad SIP is connected to the flexible printed circuit board 140, the pad area PA is bent.

With the pad area PA bent, the display panel 100 and the backlight unit 200 are accommodated in the space between the upper cover 410 and the lower cover 420.

Although exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display panel comprising:
   an array substrate comprising:
      a display area, a non-display area surrounding the display area, and a pad area extended from a side of the non-display area,
      the non-display area comprising a first non-display area adjacent to the pad area, and a second non-display area except for the first non-display area;
      a first base substrate in the display area and in the non-display area, disposed non-overlapping with the pad area;
      an organic polymer layer in the display area, in the pad area and in the first non-display area;
      a thin film transistor in the display area;
      a pixel electrode connected to the thin film transistor; and
      a signal input pad connected to the thin film transistor and on the organic polymer layer in the pad area,
      wherein
      the organic polymer layer in the display area is between the thin film transistor and the first base substrate, and
      the organic polymer layer in the first non-display area is between the signal input pad and the first base substrate, the organic polymer layer in the first non-display area extending further than the first base substrate to be disposed in the pad area nonoverlapping with the first base substrate,
   an opposite substrate facing the array substrate, the opposite substrate comprising a second base substrate, and a common electrode on the second base substrate; and
   a liquid crystal layer between the array substrate and the opposite substrate.

2. The display panel of claim 1, wherein the organic polymer layer extends from the first non-display area to the display area of the first base substrate.

3. The display panel of claim 1, wherein the array substrate further comprises an insulating layer between the organic polymer layer and the thin film transistor.

4. The display panel of claim 3, wherein the insulating layer comprises at least one of silicon nitride or silicon oxide.

5. The display panel of claim 1, wherein
   the array substrate further comprises an insulating layer which overlaps the organic polymer layer and the first base substrate, and
   the thin film transistor is on the insulating layer.

6. The display panel of claim 1, wherein a trench is defined in the first base substrate, the trench in the non-display area and adjacent to the pad area.

7. The display panel of claim 6, wherein the organic polymer layer is in the trench defined in the first base substrate and extends further than the first base substrate to be disposed in the pad area non-overlapping with the first base substrate.

8. The display panel of claim 7, wherein
   the array substrate further comprises an insulating layer which overlaps the organic polymer layer and the first base substrate, and
   the thin film transistor is on the insulating layer.

9. The display panel of claim 1, wherein the organic polymer layer has a thickness of about 3 micrometers to about 50 micrometers.

10. The display panel of claim 9, wherein the organic polymer layer comprises at least one of polyethyleneterephthalate, polyethylenenaphthalate, polycarbonate, polyetherimide, polyethersulfone, polyetheretherketone or polyimide.

11. The display panel of claim 1, wherein the organic polymer layer comprises colored material which prevents leaking of light traveling to the display area.

* * * * *